United States Patent [19]
Peress

[11] 3,759,550
[45] Sept. 18, 1973

[54] FLEXIBLE JOINTS
[76] Inventor: Joseph S. Peress, Moorcraft, Lammas Ln., Esher, England
[22] Filed: Aug. 30, 1971
[21] Appl. No.: 176,191

[30]   Foreign Application Priority Data
    Sept. 4, 1970   Great Britain .................... 42,620/70

[52] U.S. Cl. ..................... 285/11, 2/2.1 R, 285/263
[51] Int. Cl. ............................................. F16l 27/00
[58] Field of Search ...................... 285/263, 10, 11, 285/261, 264, 166, 331, 262; 2/2.1 R, 2.1 A; 277/30

[56]            References Cited
             UNITED STATES PATENTS
1,368,786   2/1921   DeGraff ......................... 285/264 X
1,402,645   1/1922   Peress ................................ 285/10
1,888,026   11/1932  Chapman .............................. 285/11
1,146,781   7/1915   Bowdoin .............................. 2/2.1 R
1,414,174   4/1922   Campos ........................... 285/10 X
1,947,657   2/1934   Peress .................................. 285/11
711,342    10/1901   Petrie ................................. 2/2.1 R FOREIGN PATENTS OR APPLICATIONS
94,537    12/1897   Germany ........................... 285/263
725,328    9/1942   Germany ........................... 285/264

Primary Examiner—Thomas F. Callaghan
Attorney—Donald M. Wight et al.

[57]            ABSTRACT

A flexible joint for use with apparatus subjected to an internal/external pressure differential such as used in submersible diving apparatus. The joint comprises an annular male member movably housed within an annular female member. The male member has an annular piston which moves in a closed annular cylinder carrying a sealing liquid in the female member and sealing means are carried on the cylinder walls which engage and seal the walls of the annular piston.

5 Claims, 1 Drawing Figure

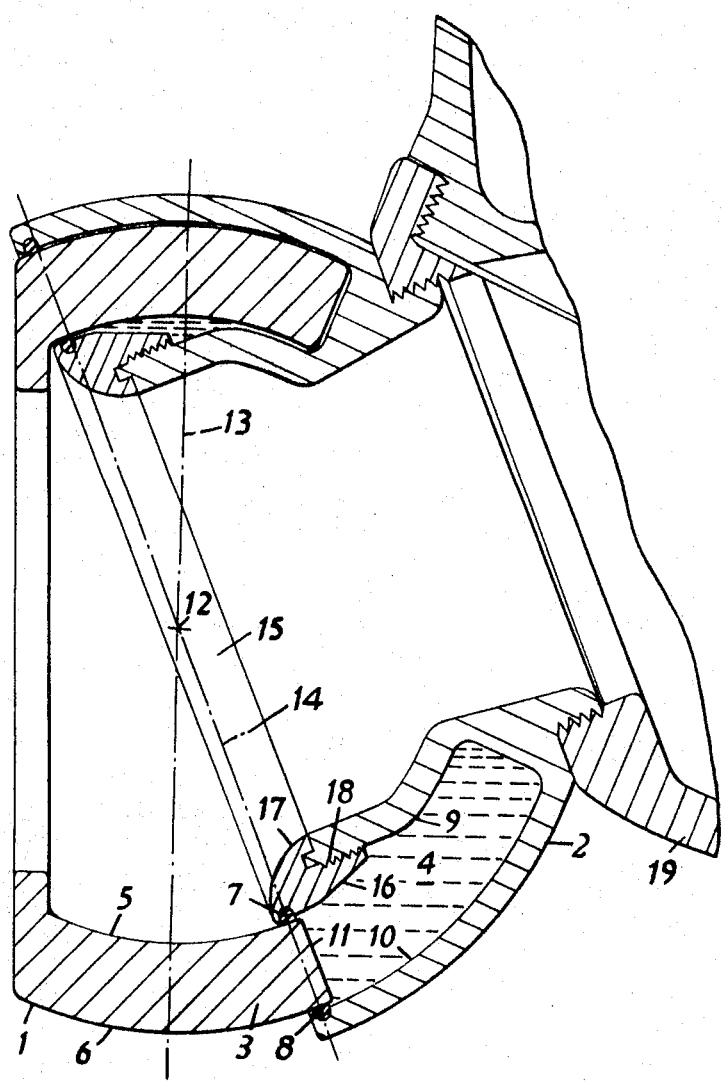

FLEXIBLE JOINTS

This invention relates to a flexible joint for use with apparatus subjected to an internal/external pressure differential and to apparatus incorporating such joints. Thus, the joint can be used in connection with submersible diving apparatus for example an armoured deep diving suit or for any other purpose such as a pipeline in which such a joint or apparatus is required.

In the Applicant's British Pat. No. 400,386 a joint for use with diving apparatus is described in which sealing is provided by arranging for one part of the joint to move in a chamber carried in the other part of the joint which is filled with fluid. One part of the joint is in the form of an annular piston and the other part is in the form of an annular cylinder, the annular piston carrying an annular packing which is tightened by the pressure acquired by the liquid during submergence. It is to be noted that the internal pressure in the cylinder is always greater than the pressure to which the joint is subjected. When in use angular movement of the piston causes a displacement of the fluid in the annular cylinder from one side to the other and as this fluid is always under pressure, it will be seen that there is a greater area exposed to the internal fluid pressure on one side than in the other.

Thus the side of the cylinder towards which the internal fluid has been displaced has a greater force exerted upon it than on the other side and this tends to cause a certain degree of distortion to take place.

This distortion of the cross section of the annular cylinder can cause a change in the corresponding shape of the piston when the seals expand to conform to the shape of the distorted cylinder and take up the resulting gap between the cylinder walls.

According to the present invention a joint for use with apparatus subjected to external fluid pressure comprises an annular male member movably housed within an annular female member, the male member having an annular piston which moves in a closed annular cylinder carrying a liquid in the female member, and sealing means carried on the cylinder walls which engage and seal the walls of the annular piston. Thus though subjected to the same pressures, by placing the sealing means on the cylinder walls instead of on the piston, no variation can occur on the piston and the cross-section and the area remain constant.

Preferably the sealing means are resilient sealing rings carried adjacent the mouth of the cylinder.

If required the annular piston and the annular cylinder can both be part-spherical thus enabling a joint having angular movement to be constructed.

With this arrangement the head of the piston is preferably arranged to be radial to the centre of rotation of the joint.

In a preferred embodiment the piston is made in one piece and in order to assist assembly the female member can be provided with a detachable wall part which forms a portion of the wall of the cylinder.

With this arrangement the detachable wall part may provide part of the inner wall of the annular cylinder and may be in the form of a collar which carries part of the sealing means.

The joint is particularly useful with suits subjected to an internal/external pressure differential such as an armoured diving suit and the invention therefore also includes a protective suit or apparatus incorporating a joint as set forth above.

The invention may be performed in many ways, but one embodiment will now be described by way of example and with reference to the accompanying drawing which is a cross-sectional elevation through the wrist joint on the arm of an armoured diving suit incorporating the invention.

In the arrangement to be described and as shown in the drawing the wrist joint of the submersible armoured diving suit comprises an annular male member 1 which is movably housed within an annular female member 2. Both members are part-spherical and the male member 1 has an annular part-spherical piston 3 which is movable in a co-operating annular part-spherical cylinder 4 provided in the female member 2. The inner surface 5 and outer surface 6 of the piston are parallel and co-operate with annular resilient sealing rings 7 and 8 which are carried on the inner wall 9 and outer wall 10 of the cylinder 4 adjacent its mouth. The head 11 of the piston 3 is radial to the axis of the sphere which is indicated by referance numeral 12 and the head 11 of the piston extends to one side of a plane passing diametrically through the axis of the joint and through the male member, such a plane being indicated by reference numeral 13. The major portion of the length of the annular cylinder extends to one side of a plane passing diametrically through the axis of the joint, such a plane being indicated by a broken line 14.

The annular piston is preferably made from a single piece of metal which is accurately machined to shape and the main portion of the female member 2 is also preferably machined from solid piece of metal. Part of the inner wall 9 of the cylinder 4 is however detachable this portion being provided in the form of a collar 15 preferably split to assist assembly, the outer periphery 16 of which is shaped to form part of the inner wall 9. This collar 15 carries the sealing ring 7 in a groove and the collar itself is screw threaded to enable it to cooperate with a screw thread 18 within the cylinder although it could be connected by any other convenient means. In order to assemble the joint the piston is first inserted into the cylinder and the collar is then screwed into position.

The cylinder above the piston 3 is filled with a hydraulic fluid such as oil or glycerine, by means of an opening, (not shown) which is subsequently closed and sealed.

It will be seen from the drawing that the piston extends for approximately equal angular distances about the centre of the joint and it can thus rotate in the female member about these angles. It can also revolve in the female member and any suitable hand or closure can be attached to its outer end. The other end of the female member 2 is preferably screw threaded into another annular member 19 which provides the forepart of the arm of the suit.

The term "protective suit or apparatus" is used herein not only to include suits having arms and legs by which the occupant, such as a diver, is protected but also chamber from which mobile limbs project or, indeed, any kind of protective apparatus for which such a joint is required.

Such a flexible joint could also be incorporated in a suit for working in pressurised atmosphere or vacuum atmospheres such as one encountered in space activities, or be employed wherever there is a requirement for a hollow flexible joint which is subjected to an internal/external pressure differential, for example, a pipeline.

I claim:

1. In a protective suit subjected to an internal/external pressure differential, a flexible joint having passage means therethrough for the reception of a human limb, said flexible joint comprising an annular male member movably housed within an annular female member, said male member at least in part defining an annular part-spherical piston having radially displaced inner and outer walls and a head, said female member at least in part defining a part-spherical closed annular cylinder defined by spaced inner and outer walls with one end of said cylinder being open and receiving said piston for angular movement within said cylinder, the spacing of said cylinder inner and outer walls being greater than the spacing of said piston inner and outer walls with there being a positive clearance between respective walls of said piston and cylinder, a sealing liquid within said cylinder in direct contact with said piston and surrounding said piston head and that portion of said piston inner and outer walls disposed within said cylinder, and fixed narrow annular inner and outer sealing ring means carried on said cylinder inner and outer walls adjacent said open end and slidably engaging said piston walls with said inner and outer cylinder walls being subjected to the pressure of said sealing liquid in all positions of said piston, said piston and said cylinder having a common centre of rotation, said inner and outer sealing ring means lying in a plane extending generally through said common centre, the initial relative positions of said piston and said cylinder and the depth of said cylinder being one wherein when said piston is moved to an angular position relative to said cylinder said piston head engages said cylinder closed end prior to a diametrical opposed portion of said piston moving out from between said inner and outer sealing ring means thereby maintaining said piston within said cylinder and the seals between said piston and said cylinder.

2. A flexible joint as claimed in claim 1 in which said piston head is located radial to the centre of rotation of the joint.

3. A flexible joint as claimed in claim 1 in which the female member has a detachable wall part which forms a portion of one of the walls of the cylinder which can be removed to assist assembly.

4. A flexible joint as claimed in claim 3 in which the detachable wall part provides part of the inner wall of the annular cylinder.

5. A flexible joint as claimed in claim 3 in which the detachable part is in the form of a collar which carries one of the ring sealing means.

* * * * *